United States Patent
Tsau et al.

(10) Patent No.: US 6,948,924 B2
(45) Date of Patent: Sep. 27, 2005

(54) MOLD ASSEMBLY WITH MODULAR MOLD SHELLS

(75) Inventors: Tar Tsau, Burlington (CA); Reinhold Ernst Nitsche, Caledonia (CA); Kyi San Kyi, Burlington (CA)

(73) Assignee: Wentworth Mold Inc., Hamilton (CA)

( * ) Notice: Subject to any disclaimer, the term of this patent is extended or adjusted under 35 U.S.C. 154(b) by 218 days.

(21) Appl. No.: 10/411,339

(22) Filed: Apr. 11, 2003

(65) Prior Publication Data

US 2004/0202746 A1 Oct. 14, 2004

(51) Int. Cl.⁷ .......................... B29C 49/48; B29C 49/64
(52) U.S. Cl. ........................ 425/195; 249/102; 249/111; 425/522; 425/526
(58) Field of Search .............................. 425/522, 192 R, 425/195, 182, 526; 249/102, 155, 111

(56) References Cited

U.S. PATENT DOCUMENTS

| | | | |
|---|---|---|---|
| 170,464 A | * 11/1875 | Bakewell, Jr. .............. | 249/103 |
| 3,380,121 A | 4/1968 | Chittenden et al. | |
| 3,861,640 A | 1/1975 | Agneta | |
| 3,978,910 A | 9/1976 | Gladwin | |
| 4,032,278 A | 6/1977 | Kuenzig et al. | |
| 4,151,976 A | 5/1979 | Schurman | |
| RE30,215 E | 2/1980 | Kuenzig et al. | |
| 4,330,248 A | 5/1982 | Platte | |
| 4,699,585 A | * 10/1987 | Giese et al. ................ | 425/522 |
| 4,815,960 A | 3/1989 | Rudolph | |
| 4,822,543 A | * 4/1989 | Iizuka et al. ................ | 264/521 |
| 4,863,046 A | 9/1989 | Collette et al. | |
| 4,884,961 A | * 12/1989 | Iizuka et al. ................ | 425/195 |
| 4,927,680 A | 5/1990 | Collette et al. | |
| 5,217,729 A | * 6/1993 | Terauchi et al. ............ | 425/522 |
| 5,255,889 A | 10/1993 | Collette et al. | |
| 5,411,699 A | 5/1995 | Collette et al. | |
| 5,571,474 A | 11/1996 | Przytulla | |
| 5,766,299 A | * 6/1998 | Miller ........................ | 425/526 |
| 5,968,560 A | 10/1999 | Briere et al. | |
| 6,113,377 A | 9/2000 | Clark | |
| 6,428,302 B1 | 8/2002 | Tsau | |
| 6,444,159 B2 | 9/2002 | Petre | |
| 6,447,281 B1 | 9/2002 | Petre | |

FOREIGN PATENT DOCUMENTS

| | | | |
|---|---|---|---|
| CA | 2082350 | 11/1995 | |
| CA | 2313881 A1 | * 1/2002 | ........... B29C/49/48 |
| GB | 2 240 300 | 7/1991 | |
| JP | 63-202425 | 8/1988 | |

* cited by examiner

Primary Examiner—Robert B. Davis

(57) ABSTRACT

A mold assembly for forming a container has two modular mold half shells that are adapted to be surrounded by mold half carriers. Each modular mold half shell has an upper body mold section and at least one lower body mold section. The upper body mold sections of the mold half shells are releasably secured in vertical registry with the mold half carriers. The upper body mold sections have upper inner walls defining an upper cavity whose shape corresponds to an upper portion of the container to be formed. The modular mold half shell have at least one lower body mold section and preferably multiple interchangeable lower body mold sections that are releasably secured with the upper body mold section. The lower body mold sections have lower inner walls defining a lower cavity whose shape corresponds to a lower portion of the container to be formed.

20 Claims, 5 Drawing Sheets

MOLD ASSEMBLY WITH MODULAR MOLD SHELLS

RELATED APPLICATION

The present application is related to Applicant's commonly assigned U.S. patent application Ser. No. 10/411,177 filed concurrently herewith and entitled Hot Filled Mold Shell Assembly with Reduced Heat Transfer.

FIELD OF THE INVENTION

The present invention relates to modular molds for making containers and, more particularly, to mold carriers surrounding modular mold shells with interchangeable parts which permit for height, volume and shape adjustments to the container being formed.

BACKGROUND OF THE INVENTION

Mold assemblies comprising two side mold parts and a base mold part are commonly used in the formation of plastic containers such as, for example, biaxially-oriented PET (polyethylene terephthalate) beverage bottles. The side mold parts usually are a unitary half-part construction or multiple modular half-parts. Also unitary half shells carried by a mold carrier are utilized.

One typical modular mold assembly for use in a hot fill application is disclosed in U.S. Pat. No. 5,411,699 issued May 2, 1995 to Collette et al. This patent teaches the use of a modular mold having vertical height adjustments by the insertion of shims into the mold. However, the modular mold disclosed is not suited for use in mold shell technology where mold half shells are supported by mold carriers.

While unitary mold half shell parts are known in the art, when there is a need to change the volume or length of the container to be formed, this requires the use of different full length unitary half shell parts adding to mold development costs.

SUMMARY OF THE INVENTION

It is desired to provide a modular mold assembly for use in hot fill mold and other applications that has mold carriers with interchangeable modular mold half shells whose length and shape may be adjusted to accommodate for varying sizes of containers to be formed without having to tool complete unitary mold half shells of different lengths.

The present invention relates to a mold assembly for forming a container. The mold assembly comprises two modular mold half shells that are adapted to be surrounded by mold half carriers. Each modular mold half shell has an upper body mold section and at least one lower body mold section. The upper body mold sections of the mold half shells are releasably secured in vertical registry with the mold half carriers. Each of the upper body mold sections has upper inner walls defining an upper cavity whose shape corresponds to at least an upper portion of the container to be formed. Each modular mold half shell has at least one lower body mold section and preferably multiple interchangeable lower body mold sections that are releasably secured with the upper body mold section and thereby indirectly held in vertical registry with the mold carriers.

It should be understood that during container formation in the mold half shells, a perform, carried by the molding machine, is inserted into the mold half shells with the neck of the preform held by the molding machine in a predetermined fixed position relative to the upper body mold sections of the mold half shells. Accordingly, the vertical registry of the upper body mold sections with the mold half carriers permits for the proper predetermined positioning of the upper body mold sections with respect to the preform. This permits for adjustments either to the upper inner walls of the upper body mold sections to change the shape and length of the upper body of the container, or, alternatively, to the lower body mold section to permit for changes in shape and length of the lower body portion of the container. Both these adjustments allow for flexibility in mold container formation without altering the predetermined fixed relative position of the upper body mold sections relative to the mold carriers and relative to the preform carried by the mold machine.

Preferably, the vertical registry is achieved by the upper body mold sections having outer walls with a continuous groove cut therein that extends axially around these outer walls and inner walls of the carriers each having a flange half ring interconnecting member extending in therefrom that is adapted to fit into the continuous groove of the outer walls of the upper body mold sections.

Typically the flange half ring has a flat upper shoulder that abuts against an upper ledge of the continuous groove in the outer wall of the upper body mold section. Consequently, the upper body mold sections are held by gravity in vertical registry with the mold carriers. It should be understood that in some embodiments, it may be possible for both the outer wall of the upper body mold sections and the inner walls of the carriers to have grooves positioned substantially laterally adjacent each other. In this instance, the flange half ring interconnecting member does not form an integral part of the mold carrier inner wall but, instead forms an independent part that may be fitted into both the grooves found in the outer wall of the upper body mold sections and the inner walls of the carriers.

Preferably, the at least one lower body mold section comprises a main lower body mold section defining a main body portion of the container to be formed and a first shim mold section defining a first minor body portion of the container to be formed. The first shim mold section is sandwiched between the upper body mold section and an upper wall of the main lower body mold section. Preferably, the lower body mold section also has a second shim mold section having second shim inner walls defining a second minor body portion of the container. The second shim mold section buts against a lower wall of the main lower body mold section. The placement of shims on opposing ends of the main lower body mold section permits for symmetrical elongation of the body when so desired. Alternatively, only one shim may be utilized on one side of the main body portion.

It is envisaged that fasteners pass through the upper body mold section, the first shim mold section and at least into the main lower body mold section to releasably secure the upper body mold section with the first shim mold section and the main lower body mold section. Further additional fasteners may pass through the second shim mold section and at least into the main lower body mold section to releasably secure the second shim mold section with the main body mold.

In addition, internal passageways or channels may extend along the length of the main and shim body sections of the shell insert through which liquid flows to regulate temperature of the inner walls of the shell insert for a hot fill application to a predetermined temperature. These passageways extend in sealed relation between or across the main lower body mold section, the shim lower body mold sections and/or the upper body mold section.

In accordance with the present invention there is provided a mold assembly for forming a container from a preform having a neck. The mold assembly comprises a pair of modular mold half shells. The modular mold shells each comprise a pair of upper body mold sections and at least one pair of lower body mold sections. The upper body mold sections have upper inner walls defining an upper cavity whose shape corresponds to an upper body portion of the container to be formed. The lower body mold sections are each releasably secured with a corresponding one of the pair of upper body mold sections. The lower mold sections have lower inner walls defining a lower cavity whose shape corresponds to a lower body portion of the container to be formed. The mold assembly further comprises two mold half carriers surrounding the upper and lower body mold sections. The two mold half carriers are moveable between an open position allowing access to the two modular mold half shells and a closed position for formation of the container. The two mold half carriers releasably secure in vertical registry relative thereto the upper body mold sections. Consequently, this permits adjustments to length and shape of the upper inner walls of the upper body mold sections and to the lower inner walls of the lower body mold sections to vary length and shape of the container without effecting the fixed position between the upper body mold sections and the mold half carriers.

BRIEF DESCRIPTION OF THE DRAWINGS

For a better understanding of the nature and objects of the present invention reference may be had to the accompanying diagrammatic drawings in which.

DETAILED DESCRIPTION OF THE PREFERRED EMBODIMENTS

Figure 1:
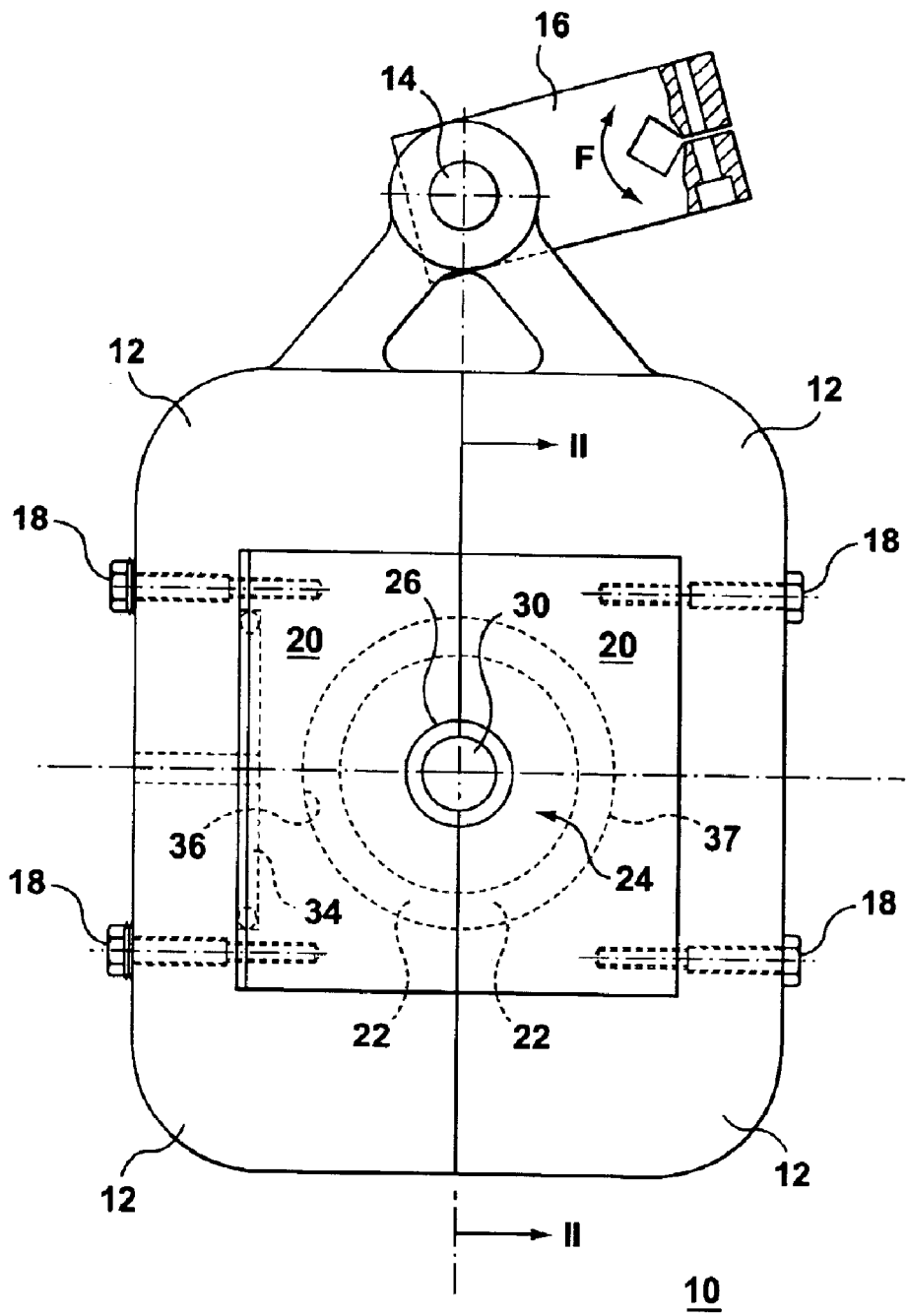
FIG. 1 is a plan view of the mold assembly of the present invention.

Referring to the drawings the preferred embodiments of the present invention is described. While the mold apparatus described herein is adapted for making a hot fill PET bottle it should be understood that the mold apparatus shown can be used for other types of containers where the mold face is changed, such as for example, soft drinks, cleansers and detergent type containers to name a few.

In FIG. 1 the mold assembly 10 includes a pair of support arms 12 which pivot about pivot pin or axis 14. A lever arm 16 causes the support arms 12 to pivot about axis 14 to move the support arms 12 into the closed position shown. The support arms 12 support, through threaded bolts 18, or any other suitable connecting device, two mold half carriers 20. The mold half carriers 20 each carry a modular mold half shell 22. In the closed position shown, modular mold half shells 22 define a cavity 24 whose shape determines the shape of the container formed in the cavity 24. During container formation, the support arms 12 hold the mold half carriers 20 and shells 22 in the closed position shown.

Figure 2:
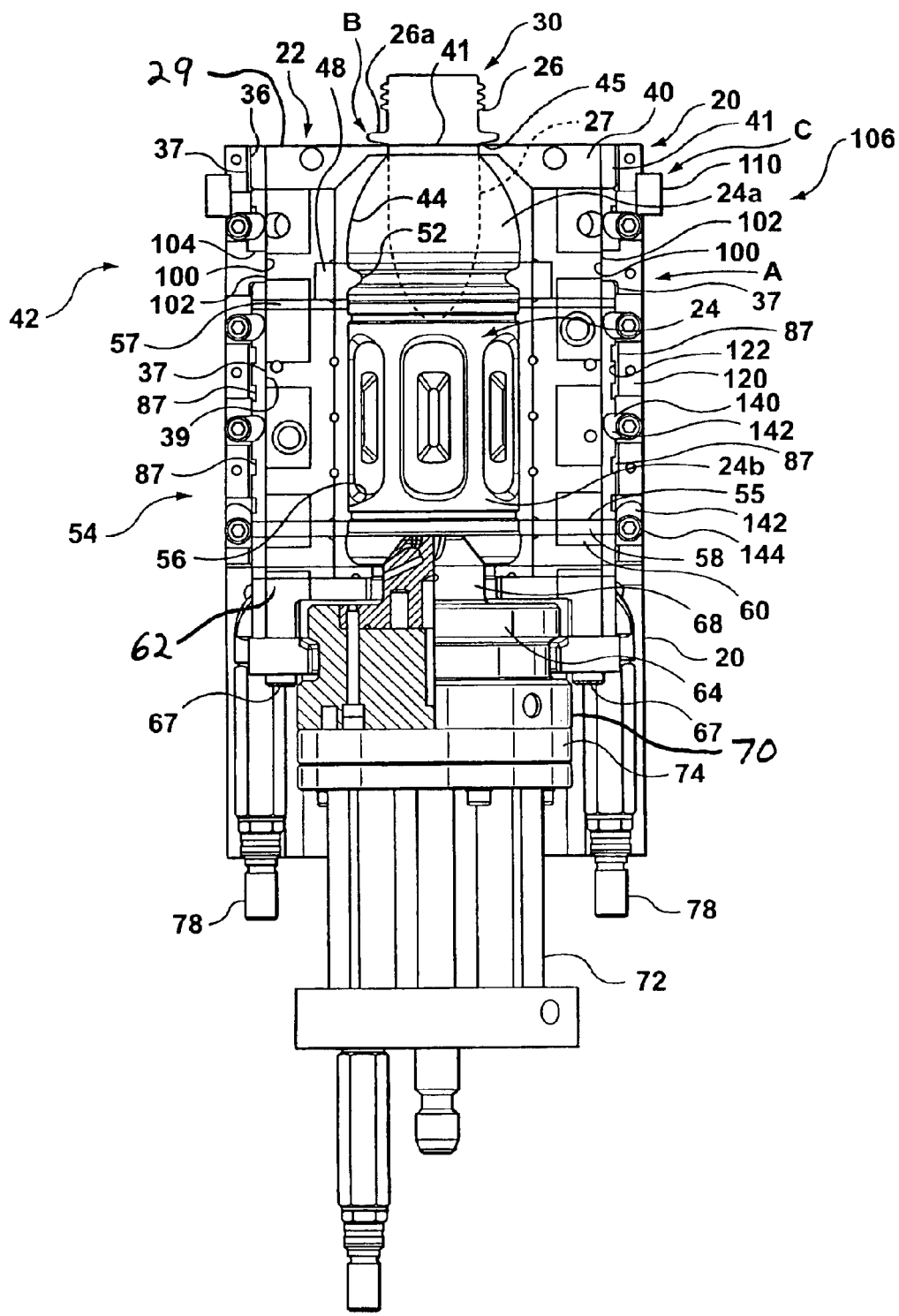
FIG. 2 is a side sectional view of the mold assembly as seen at lines II—II of FIG. 1.
Figure 3:
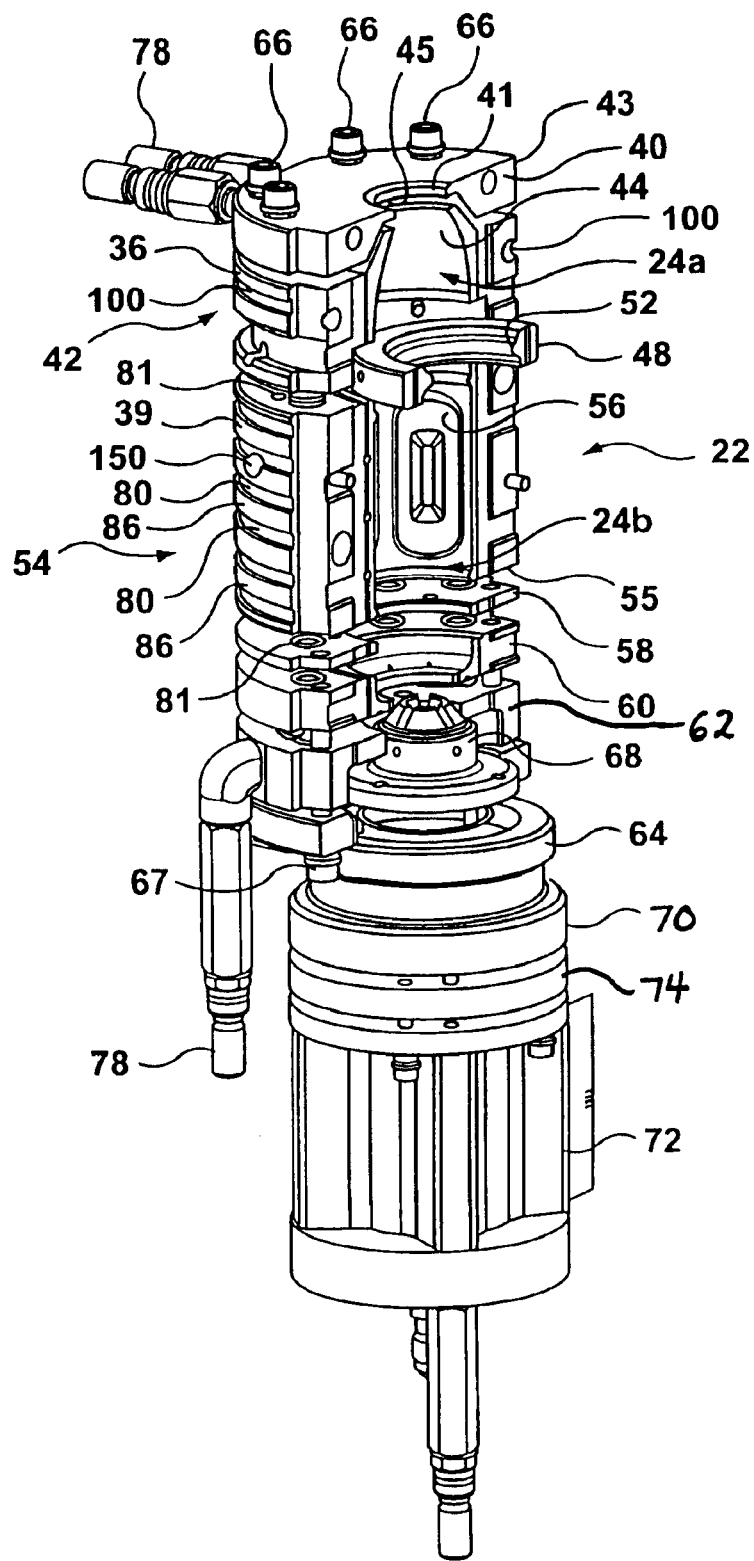
FIG. 3 is a partially exploded view of a portion of an alternative embodiment of the mold assembly illustrating one lower shim lower body mold section.

Referring to FIGS. 1 to 3, a plastic preform 30 has a neck 26 and an elongated tubular portion 27. The neck 26 is mounted by a molding machine (not shown) against top surface 29 of the mold shells 22 with the tube portion 27 of the preform 30 extending into the cavity 24 of the mold shells 22. Pressurized air is blown by a nozzle into neck 26 of a preform 30 to expand tube 27 into the cavity 24. Later in the formation, the support arms 12 are pivoted about axis 14 to separate the carriers 20 and shells 22 to permit removal of the formed container and to permit interchanging of shells 22 from carriers 20.

The two modular mold half shells 22 each have an upper body mold section 42 and a lower body mold section 54 releasably secured to the upper body mold section 42. The upper body mold section 42 has upper inner walls 44 defining an upper cavity 24a whose dome shape corresponds to at least an upper portion of the container to be formed. The upper body mold section 42 has a first outer wall 36 that buts against inner wall 37 of one of the carriers 20. The lower body mold section 54 has body inner walls 56 defining a lower cavity 24b that corresponds to at least a portion of the body of the container to be formed. The lower body mold section 54 has a second outer wall 39 also butting against the inner wall 37 of one of the carriers 20. As best seen in FIG. 3, the outer wall 39 comprises spaced apart outer wall surface portions 86 inter spaced by recessed grooves 80.

Figure 2A:
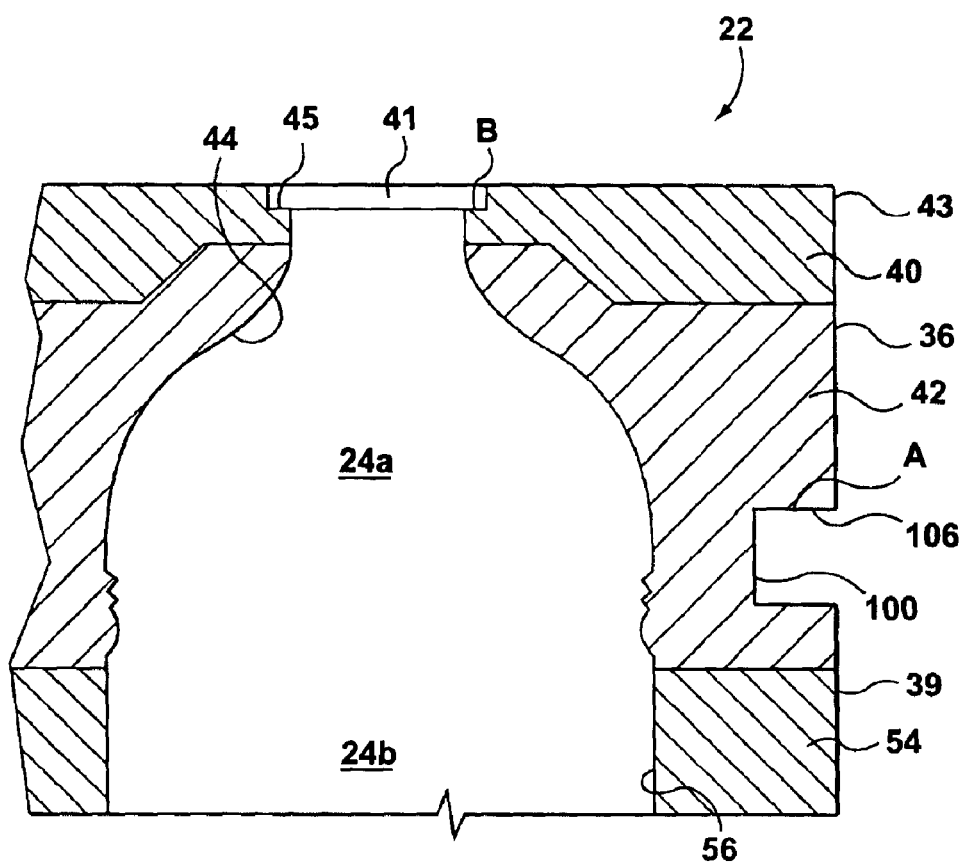
FIG. 2a is a partial enlarged side sectional view of the modular mold half shells of FIG. 2.

In addition to the modular parts of each mold half shell 22 described above each mold half shell 22 comprises top cavity inserts 40 which define an aperture or opening 41 through which the preform 30 may be inserted. The top cavity insert 40 forms a composite part of the upper body mold section 42. The top cavity inserts 40 have third outer walls 43 which are also surrounded by the inner walls 37 of the carriers. As best seen in FIG. 2a, the top cavity inserts 40 have a seating surface 45. In this embodiment, the seating face 45 is recessed in the top cavity inserts 40 and surrounds the aperture 41. The seating face 45 may alternatively be elevated or comprise several faces positioned on the same plane. The seating face 45 is adapted to receive the neck 26 of the preform 30 and positively locate the neck 26 against the seating face 45.

The upper body mold section 42 is further adapted to receive cavity insert 48 which has a convex shaped groove 52 that is formed in the container and is best shown in FIG. 3.

The upper body mold section 42 has a continuous axially extending groove 100 that extends around the periphery of the first outer wall 36. The mold carriers 20 each include a ring shaped flange member 102 (see FIG. 2) formed integrally with the mold carriers 20 that extends inwardly from the inner walls 37 of the carriers 20. Alternatively, the flange member 102 can be an independent part that also fits into a corresponding groove in the inner walls 37 of the mold half carriers 20. The flange member 102 has an upper shoulder 104 against which an upper ledge 106 of the groove 100 rests by gravity so as to maintain the vertical registry of the mold carrier 20 adjacent flange member 102 at location A in a fixed vertical relation to the seating face 45 of the top cavity inserts 40 at location B. Furthermore, the mold carriers 20 are located relative to the arms 12 by a locating ring 110. This locating ring 110 represents a position C.

It should be understood that the position C of the mold carriers 20 is maintained in a fixed position relative to the molding machine (not shown). Further due to the vertical registry between the upper mold sections 42 and the mold carriers 20 provided by the carrier interconnecting or flange member 102, location A of the carriers 20 remains fixed vertically relative to location B of the top cavity inserts 40. Hence, the location of the top cavity inserts 40 at location B is fixed vertically relative to the mold machine so as to provide for the proper insertion of the tubular portion 27 of the preform 30 into cavity 42 and the proper positioning of the preform neck 26 at it's flange 26a against the seating surface 45 of the modular mold shells 22.

The present invention provides for the lower body mold sections 54 to be releasably secured with the upper body mold sections 42. This permits for the lower body mold sections 54 to be held in indirect vertical registry with the mold carriers 20. Consequently the length of the lower body mold sections 54 may be altered to accommodate containers of various body lengths and shapes without effecting the relative fixed locations A and B between the mold machine and top surface portions 29 of the upper body mold sections 42.

The parting faces between the mold carriers 20 and the carrier shells 22 are shown in FIG. 2 for the mold carriers 20 at parting face 120 and for the mold half shells or modular half shells 22 at parting face 122. While the vertical registry of the modular half shells 22 is maintained by the groove 100 and flange ring 102, it should be understood that the shells 22 are releasably secured within the carriers 20 by latches 140. The latches 140 comprise tabs 142 that are rotated about locating bolts 144 mounted to the parting face 120 of the carriers 20. The tabs 142 are rotated from a vertical position to a horizontal position across the parting face 122 of the shells 22 so as to secure the shells 122 within the cavity formed in the mold carriers 20 when bolts 144 are tightened.

Referring to FIGS. 2 and 3, the modular mold shells 22 are shown to co-operate with a push up base 68 to define the base of the container to be formed. The base 68 rests upon base holder 70 which is mounted to pedestal 72 via a pedestal spacer 74.

Located below the upper body mold section 42 and forming part of the mold half shell 22 is the main lower body mold section 54. The lower body mold section 54 has a lower surface 55 against which buts a shim mold section 58. The purpose of the shim mold section 58 is to provide for a vertical length adjustment in the container body. It should be understood that while the embodiments of FIGS. 2 and 3 show a shim mold section 58 located below the main lower body mold section 54, it is also possible that a similar shim mold section 57, as seen in FIG. 2, may be located between the upper body mold section 42 and the main mold body section 54 so as to provide for the symmetrical elongation of the container.

Positioned below the shim mold section 58 is a bottom cavity insert 60. The bottom cavity insert 60 cooperates with the push up base 68 to define the bottom shape or contour of the container to be formed. Located immediately below the ring 60 is a lower cavity insert 62 which is also mounted in butting relation on top of a wear ring 64.

The modular mold shell assembly 22 is held together by a first series of four axially spaced apart fasteners 66 (see FIG. 3) passing through the top cavity insert 40, the upper body mold section 42, and into the main body portion 54. The fasteners 66 comprise threaded bolts that are received within a recessed apertures (not shown) in the top cavity insert 40. The threaded bolts 66 thread into corresponding threaded apertures in the main body portion 54.

Second fasteners 67 comprising a series of four fasteners 67 positioned axially in spaced relation about the mold half shell 22 are received within recessed slots in the wear ring plate 64 and pass through the bottom ring 62, the bottom cavity insert 60 and subsequently the shim 58 into the main body section 54. The main body section 54 has threaded female apertures (not shown) for receiving the threaded ends of the second fasteners 67.

By having two separate sets of fasteners 66 and 67 it is possible to disassemble only an upper or lower portion of the modular mold half shells 22. For instance, if one wishes to remove the lower shim 58 to reduce the overall length of the container, all one has to do is remove the second fasteners 67. Further, if one wishes to insert an additional shim between the main body portion 54 and the upper body mold sections 42, then only the upper or first fasteners 66 need to be removed. By providing modular half shells 22, the present invention allows for a quick change shell insert that may be modified to accommodate for varying lengths in the length of the container to be formed without requiring the necessity to buy a complete mold shell for each variation of container to be formed.

In the present application, the mold assembly 10 is utilized as a hot fill mold and comprises passageways or channels 78 provided at both the bottom and top of the shells 22 for supplying liquid, such as for example, oil, into the shells 22 to regulate the temperature of the mold half shells 22. The passageways 78 at the bottom shells 22 pass into the body ring 62 and up through the mold half shells 22 and out through the upper passageways 78 mounted into the top cavity insert 40. O-rings 81 (see FIG. 3) are provided between each of the sections of the mold half shells 22 so as to provide a sealed passageway extending through the mold half shells 22. In operation, heated fluid under pressure passes through one of the passageways 78 and through the mold half shells 22 and out the other end of the mold half shells 22 so as to heat inner walls 44, 56 of the upper body mold sections 42 and the lower body mold sections 54.

Figure 4:
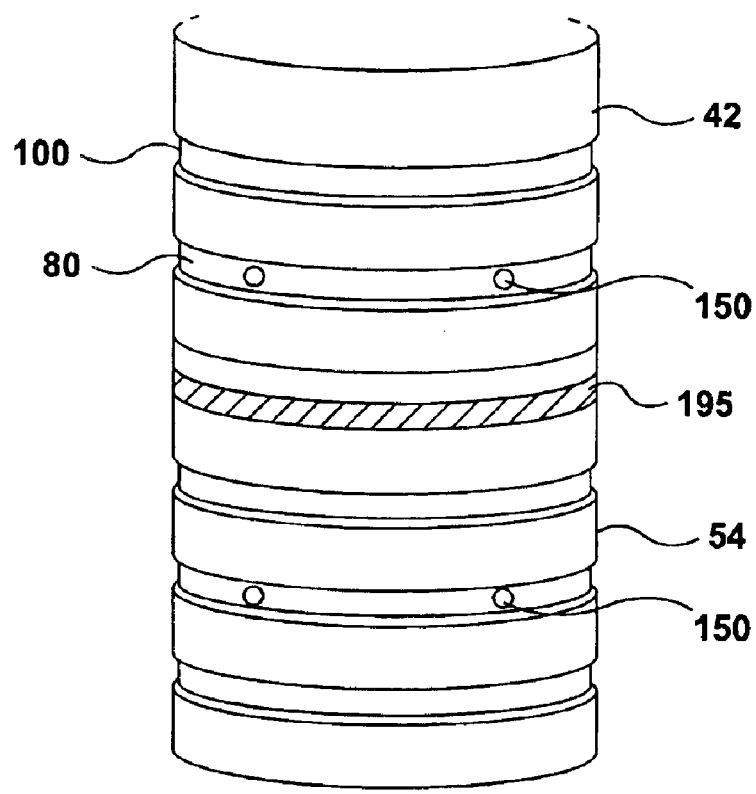
FIG. 4 shows a first pattern of grooves located on the outer walls of the mold half shells; and, FIG. 5 shows a second pattern of grooves located on the outer walls of the mold half shells.
Figure 5:
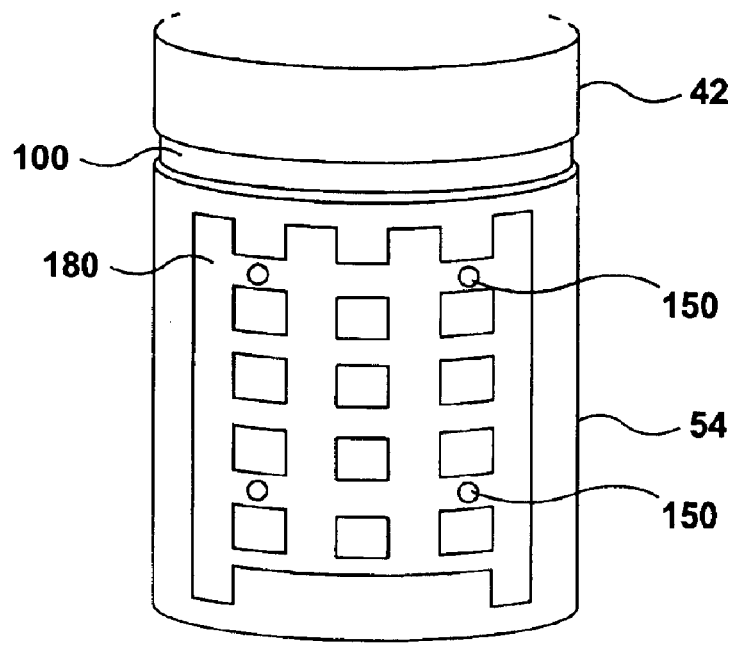

Referring to FIGS. 2 to 5 another feature of the mold half shells 22 is shown by the use of two different patterns of grooves 80 in FIGS. 2, 3, 4 and 180 in FIG. 5. These patterns of grooves 80, 180 are machined into the outer surface of both the main mold section 54 and the upper body mold section 46. The pattern of grooves 80 provide a series of longitudinally spaced apart slotted apertures providing axially extending recessed open air spaces 87. The mold half carriers 20 are adapted to surround the mold half shells 22 with the inner walls 56 of the mold half carriers 20 contacting the outer wall surface portions 86 of the mold half shells 22. This forms a series of longitudinally spaced apart open air pockets 87 extending axially around the mold half shells 22 to create thermal buffering pockets 87 that reduce thermal conduction from the mold face through the shells 22 and out through the mold carriers 20.

In the alternative embodiment of FIG. 5, a pattern of intersecting grooves is shown at 180. This pattern shows the grooves extending orthogonally to each other however the pattern is shown to simply represent that more than one form of pattern of grooves may be applied that either run in parallel to each other or intersect with each other, for example.

Also shown in FIGS. 3 through 5 are exhaust passageways 150. The exhaust passageways 150 may be located either in the grooves 80 or 180 or in the outer wall portions 87 that are spaced between each of the grooves 80, 180. The purpose of the exhaust passageways 150 is to provide an air way between the cavity 42 defined by the inner walls 44, 56 of the mold shells 22 and the outer walls 36, 39 of the mold shells 22. The air passageways 150 permit air to escape from the cavity 42 as the preform 30 is formed into a container against the inner walls 44, 56 of the mold shells 22. As the air escapes, it will flow into the grooves 80, 180 and then between the mold carriers 20 and mold shells 22 and out from the mold assembly 10 to ambient.

In FIG. 4, one of the grooves 80 is shown filled with an insulating material 195. It should be understood that all or some of the grooves may be filled with insulating material 195. The thermal buffering provided by the insulating material is better than that of air and may be preferred in certain applications. Further, the material 195 may comprise, for example, rubber cut to fit into the slots and provided with exhaust passageways where necessary. Alternatively, the insulating material may, for example, comprise an paste that solidifies after it is inserted into the grooves 80.

It should be understood at alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A mold assembly for forming a container from a preform having a neck, the mold assembly comprising:
   (a) a pair of modular mold half shells each comprising:
      (i) a pair of upper body mold sections having upper inner walls defining an upper cavity whose shape corresponds to an upper body portion of the container to be formed;
      (ii) at least one pair of lower body mold sections each releasably secured with a corresponding one of the pair of upper body mold sections, the at least one pair of lower body mold sections having lower body inner walls defining a lower cavity whose shape corresponds to a lower body portion of the container to be formed; and,
      (iii) first fasteners passing through the upper body mold sections and at least into the main lower body mold sections to releasably secure the upper body mold sections with the lower body mold sections; and,
   (b) two mold half carriers surrounding the upper and lower body mold sections and being moveable between an open position allowing access to the two modular mold half shells and a closed position for formation of the container, and each of the two mold half carriers releasably securing in vertical registry therewith one of the upper body mold sections.

2. The mold assembly of claim 1 wherein the upper body mold sections have outer walls with a continuous groove cut therein that extends axially around the first outer walls and the mold half carries have inner walls from which extends a flange half ring interconnecting member that is adapted to fit into the continuous groove of the outer walls of the upper body mold sections to maintain the vertical registry.

3. A mold assembly for forming a container from a preform having a neck, the mold assembly comprising:
   (a) a pair of modular mold half shells each comprising:
      (i) a pair of upper body mold sections having upper inner walls defining an upper cavity whose shape corresponds to an upper body portion of the container to be formed; and,
      (ii) at least one pair of lower body mold sections each releasably secured with a corresponding one of the pair of upper body mold sections, the at least one pair of lower body mold sections having lower body inner walls defining a lower cavity whose shape corresponds to a lower body portion of the container to be formed, the lower body mold sections each comprising:
         a main lower body mold section having an upper wall, a lower wall, and a main body inner wall defining a main body portion of the container to be formed, and,
         a second shim mold section having second shim inner walls defining a second minor body portion of the container and the second shim mold section butting against the lower wall of the main lower body mold section; and,
   (b) two mold half carriers surrounding the upper and lower body mold sections and being moveable between an open position allowing access to the two modular mold half shells and a closed position for formation of the container, and each of the two mold half carriers releasably securing in vertical registry therewith one of the upper body mold sections.

4. The mold assembly of claim 3 wherein the lower body mold sections each comprises:
   a main lower body mold section having an upper wall, a lower wall, and a main body inner wall defining a main body portion of the container to be formed, and
   a first shim mold section having first shim inner walls defining a first minor body portion of the container and being sandwiched between the upper body mold section and the upper wall of the main lower body mold section.

5. The mold assembly of claim 4 wherein the first fasteners pass through the upper body mold section, the first shim mold section and at least into the main lower body mold section to releasably secure the upper body mold section with the first shim mold section and the main lower body mold section.

6. The mold assembly of claim 3 wherein second fasteners pass through the second shim mold section and at least into the main lower body mold section to releasably secure the second shim mold section with the main lower body mold section.

7. The mold assembly of claim 1 wherein the lower body mold sections each comprise:
   a main lower body mold section having an upper wall, a lower wall, and a main body inner wall defining a main body portion of the container to be formed,
   a first shim mold section having first shim inner walls defining a first minor body portion of the container and being sandwiched between the upper body mold section and the upper wall of the main lower body mold section; and
   a second shim mold section having second shim inner walls defining a second minor body portion of the container and the second shim mold section butting against the lower wall of the main lower body mold section.

8. The mold assembly of claim 7 wherein the first fasteners pass through the upper body mold section, the first shim mold section and at least into the main lower body mold section to releasably secure the upper body mold section with the first shim mold section and the main lower body mold section, and wherein second fasteners pass through the second shim mold section and at least into the main lower body mold section to releasably secure the second shim mold section with the main lower body mold section.

9. The mold assembly of claim 1 wherein the upper body mold section has an upper wall and each of the two modular mold half shells comprises:
 a top cavity insert supported on a top wall of the upper body mold section; and,
 the first fasteners passing through the top cavity insert, the upper body mold section and at least into the at least one lower body mold section to releasably secure the lower body mold section in fixed relation to the upper body mold section.

10. The mold assembly of claim 9 wherein each modular mold half shell comprises a bottom cavity insert and the lower body mold sections each comprise:
 a main lower body mold section having upper and lower walls, and a main body inner wall defining a main body portion of the container to be formed,
 a first shim mold section having first shim inner walls defining a first minor body portion of the container and being sandwiched between the upper body mold section and the upper wall of the main lower body mold section;
 a second shim mold section having second shim inner walls defining a second minor body portion of the container and being sandwiched between the lower wall of the main lower body mold section and the bottom cavity insert; and,
 second fasteners passing through each of the bottom cavity insert and the second shim mold section and into the at least one lower body mold section to releasably secure the bottom cavity insert, the second shim and the main lower body mold section together.

11. A mold assembly for forming a container from a preform having a neck, the mold assembly comprising:
 (a) a pair of modular mold half shells each comprising:
  (i) a pair of upper body mold sections having upper inner walls defining an upper cavity whose shape corresponds to an upper body portion of the container to be formed;
  (ii) at least one pair of lower body mold sections each releasably secured with a corresponding one of the pair of upper body mold sections, the at least one pair of lower body mold sections having lower body inner walls defining a lower cavity whose shape corresponds to a lower body portion of the container to be formed; and,
  (iii) the upper body mold section and the lower body mold sections each having respectively first and second outer walls and at least one of the first and second outer walls includes a plurality of longitudinally spaced apart recessed cut out slots extending axially there around to reduce heat transfer contact surface area between the mold half shells and the mold half carriers; and,
 (b) two mold half carriers surrounding the upper and lower body mold sections and being moveable between an open position allowing access to the two modular mold half shells and a closed position for formation of the container, and each of the two mold half carriers releasably securing in vertical registry therewith one of the upper body mold sections.

12. The mold assembly of claim 1 wherein passageways extend in sealing relation through the upper body mold sections and the lower body mold sections for supplying a liquid to regulate temperature of the mold half shells.

13. The mold assembly of claim 1 further including a base half shell portion releasably secured with the lower body mold sections and having an inner wall defining with a bottom cavity base insert the shape for a base portion of the container.

14. The mold assembly of claim 2 wherein each of the two mold half carriers and the pair of modular mold half shells have parting walls where the respective mold half carriers and modular mold half shells meet, the mold carrier parting walls having moveable latches that extend across the parting walls of the modular mold half shells to secure the shells to the carriers.

15. A mold assembly for forming a container from a preform having a neck, the mold assembly comprising:
 (a) a pair of modular mold half shells each comprising:
  (i) a pair of upper body mold sections having upper inner walls defining an upper cavity whose shape corresponds to an upper body portion of the container to be formed, the upper body mold sections having first outer walls;
  (ii) at least one pair of lower body mold sections each releasably secured with a corresponding one of the pair of upper body mold sections, the lower mold sections having second body outer walls, and the lower mold sections having lower inner walls defining a lower cavity whose shape corresponds to a lower body portion of the container to be formed;
  (iii) at least two top cavity inserts releasably secured with corresponding upper body mold sections, the top cavity inserts having third outer walls, the top cavity inserts having an aperture through which the preform passes at least into the upper cavity, and the top cavity inserts having a seating face against which the neck of the preform is positioned; and,
  (iv) passageways extend in sealing relation through the top cavity inserts, the upper body mold sections and the at least one lower body mold sections; and,
 (b) two mold half carriers having carrier inner walls surrounding the first, second and third outer walls, the two mold half carriers being moveable between an open position allowing access to the two modular mold half shells and a closed position for formation of the container, and the two mold half carriers releasably securing in vertical registry relative thereto the upper body mold sections so as to maintain the seating face of the top cavity inserts in a fixed position relative to the mold half carriers whereby adjustments to length and shape of the upper inner walls of the upper body mold sections and to the lower inner walls of the lower body mold sections may be made to vary length and shape of the container without effecting the fixed position between the seating face and the mold half carriers.

16. The mold assembly of claim 1 wherein:
 the upper body mold sections have first outer walls;
 the lower mold sections have second outer walls, and
 wherein the pair of modular mold half shells each further comprise at least two top cavity inserts releasably secured with corresponding upper body mold sections, the top cavity inserts having third outer walls, the top cavity inserts having an aperture through which the preform passes at least into the upper cavity, and the top cavity inserts having a seating face against which the neck of the preform is positioned;
 wherein the two mold half carriers have carrier inner walls surrounding the first, second and third outer walls, and the two mold half carriers releasably securing in vertical registry relative thereto the upper body mold sections so as to maintain the seating face of the top cavity inserts in a fixed position relative to the mold half carriers whereby adjustments to length and shape of the upper inner walls of the upper body mold sections and to the lower inner walls of the lower body mold sections may be made to vary length and shape of the container without effecting the fixed position between the seating face and the mold half carriers; and, wherein the first fasteners pass through the top cavity inserts, the upper body mold sections, and at least into the main lower body mold sections.

17. The mold assembly of claim 8 wherein:

the upper body mold sections have first outer walls;

the lower mold sections have second outer walls, and wherein the pair of modular mold half shells each further comprise at least two top cavity inserts releasably secured with corresponding upper body mold sections, the top cavity inserts having third outer walls, the top cavity inserts having an aperture through which the preform passes at least into the upper cavity, and the top cavity inserts having a seating face against which the neck of the preform is positioned;

wherein the two mold half carriers have carrier inner walls surrounding the first, second and third outer walls, and the two mold half carriers releasably securing in vertical registry relative thereto the upper body mold sections so as to maintain the seating face of the top cavity inserts in a fixed position relative to the mold half carriers whereby adjustments to length and shape of the upper inner walls of the upper body mold sections and to the lower inner walls of the lower body mold sections may be made to vary length and shape of the container without effecting the fixed position between the seating face and the mold half carriers; and, wherein first fasteners pass through the top cavity inserts, the upper body mold sections, the first shim mold sections and at least into the main lower body mold sections.

18. The mold assembly of claim 3 wherein:

the upper body mold sections have first outer walls;

the lower mold sections have second outer walls, and wherein the pair of modular mold half shells each further comprise at least two top cavity inserts releasably secured with corresponding upper body mold sections, the top cavity inserts having third outer walls, the top cavity inserts having an aperture through which the preform passes at least into the upper cavity, and the top cavity inserts having a seating face against which the neck of the preform is positioned; and wherein the two mold half carriers have carrier inner walls surrounding the first, second and third outer walls, and the two mold half carriers releasably securing in vertical registry relative thereto the upper body mold sections so as to maintain the seating face of the top cavity inserts in a fixed position relative to the mold half carriers whereby adjustments to length and shape of the upper inner walls of the upper body mold sections and to the lower inner walls of the lower body mold sections may be made to vary length and shape of the container without effecting the fixed position between the seating face and the mold half carriers.

19. The mold assembly of claim 4 wherein:

the upper body mold sections have first outer walls;

the lower mold sections have second outer walls, and wherein the pair of modular mold half shells each further comprise at least two top cavity inserts releasably secured with corresponding upper body mold sections, the top cavity inserts having third outer walls, the top cavity inserts having an aperture through which the preform passes at least into the upper cavity, and the top cavity inserts having a seating face against which the neck of the preform is positioned; and wherein the two mold half carriers have carrier inner walls surrounding the first, second and third outer walls, and the two mold half carriers releasably securing in vertical registry relative thereto the upper body mold sections so as to maintain the seating face of the top cavity inserts in a fixed position relative to the mold half carriers whereby adjustments to length and shape of the upper inner walls of the upper body mold sections and to the lower inner walls of the lower body mold sections may be made to vary length and shape of the container without effecting the fixed position between seating face and the mold half carriers.

20. The mold assembly of claim 11 wherein:

the upper body mold sections have first outer walls;

the lower mold sections have second outer walls, and wherein the pair of modular mold half shells each further comprise at least two top cavity inserts releasably secured with corresponding upper body mold sections, the top cavity inserts having third outer walls, the top cavity inserts having an aperture through which the preform passes at least into the upper cavity, and the top cavity inserts having a seating face against which the neck of the preform is positioned; and wherein the two mold half carriers have carrier inner walls surrounding the first, second and third outer walls, and the two mold half carriers releasably securing in vertical registry relative thereto the upper body mold sections so as to maintain the seating face of the top cavity inserts in a fixed position relative to the mold half carriers whereby adjustments to length and shape of the upper inner walls of the upper body mold sections and to the lower inner walls of the lower body mold sections may be made to vary length and shape of the container without effecting the fixed position between seating face and the mold half carriers.

* * * * *